United States Patent Office 3,423,138
Patented Jan. 21, 1969

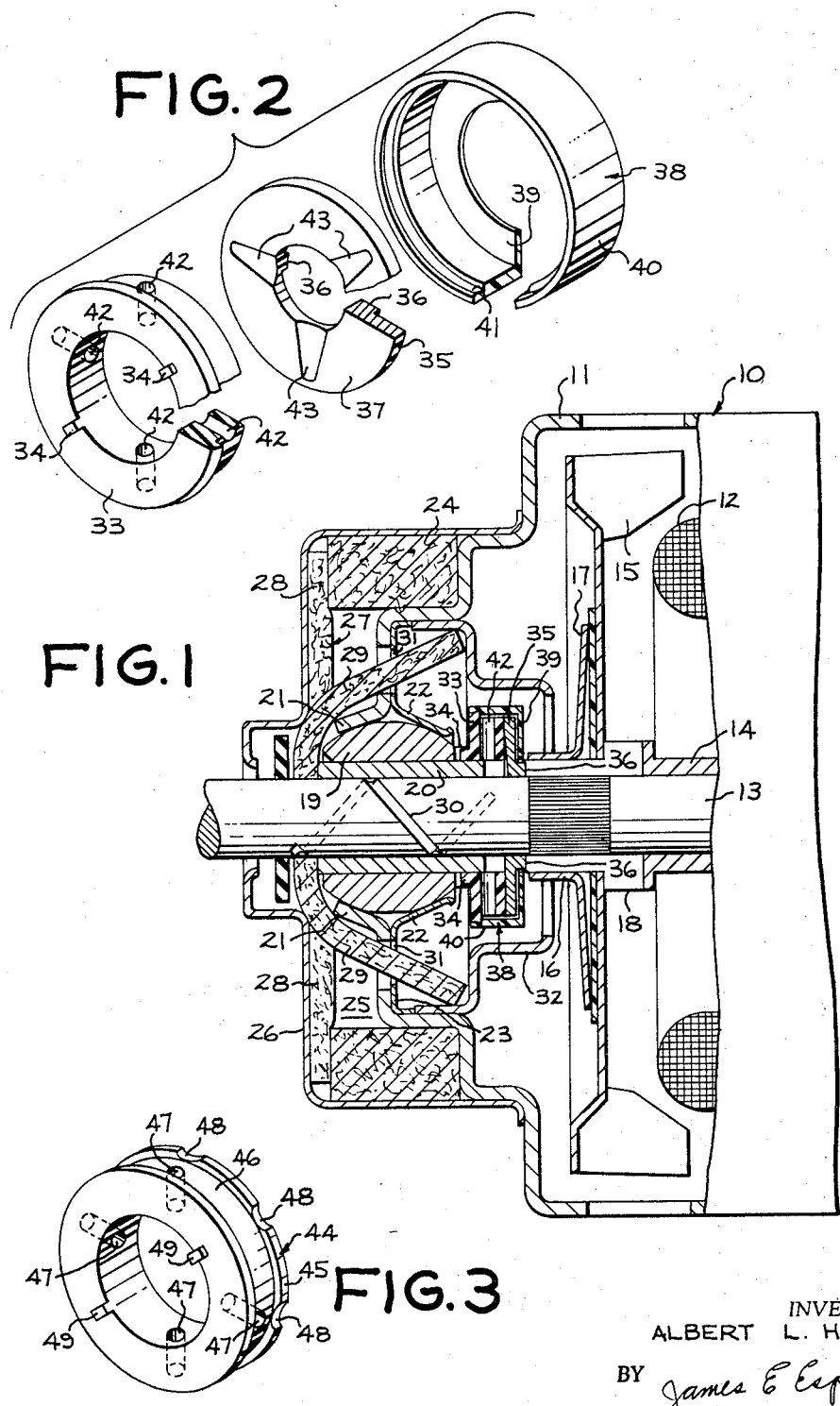

3,423,138
THRUST BEARING
Albert L. Hardy, Louisville, Ky., assignor to General Electric Company, a corporation of New York
Filed Oct. 3, 1966, Ser. No. 583,745
U.S. Cl. 308—132                8 Claims
Int. Cl. F16c 1/24, 33/66

ABSTRACT OF THE DISCLOSURE

A thrust bearing assembly that is particularly adapted for use with a horizontally disposed rotatable shaft and is provided with an improved lubricating system to maintain an adequate film of lubricant between the stationary and rotating thrust bearing surfaces.

---

This invention relates to a thrust bearing for a horizontally disposed rotatable shaft.

Many different types of thrust bearings have been proposed in the past for absorbing the axial thrust of a rotatable shaft. For example, ball, roller or needle bearings have been used with significant success; however, for shafts rotating at relatively high speeds in the magnitude of several thousand revolutions per minute these types of bearings become noisy and thus may be unsuitable for some applications. Another type of thrust bearing is the dry thrust plate which, due to absence of lubrication, is limited in its usefulness to comparatively low force and velocity applications. Lubricated thrust plates have proven quite successful for use on vertical shafts wherein the bearing can be immersed in lubricant so that a dynamic oil film will be maintained. However, in horizontal shaft applications, lubricated thrust plates generally fail to maintain a dynamic oil film since they tend to eject oil, due to centrifugal forces, at a greater rate than it can be fed thereto. When the oil film breaks down, direct contact between stationary and rotating parts occurs resulting in rapid wear and eventual failure. Thus, it would be desirable to provide an improved thrust bearing for a horizontal shaft which has the advantages of the thrust plate arrangement while avoiding the direct contact between stationary and rotating parts which may occur if an oil film is not maintained.

Accordingly, it is an object of this invention to provide an improved thrust bearing for a rotatable shaft.

It is another object of this invention to provide an improved thrust bearing for use with a horizontally disposed rotatable shaft.

It is another object of this invention to provide a thrust bearing for use with a horizontally disposed shaft which has an improved lubricating system to maintain adequate oil film on the bearing under dynamic conditions.

Briefly stated, in accordance with one aspect of the present invention, there is provided a thrust bearing assembly for a rotatable shaft which comprises a stationary thrust plate having a first bearing surface and a rotatable thrust plate carried by the shaft and having a second bearing surface facing the first bearing surface. A stationary housing is disposed about the rotatable thrust plate. At least one radially extending groove is provided in the second bearing surface and terminates short of the periphery of the second bearing surface. Means are provided to supply lubricant to the inner portion of the second bearing surface. A plurality of passageways are provided in the stationary thrust plate and extend from the periphery of the stationary thrust plate to the inner portion of the second bearing surface.

While the specification concludes with claims particularly pointing out and distinctly claiming the subject matter which is regarded as the invention, it is believed the invention will be better understood from the following description taken in connection with the accompanying drawing, in which:

FIGURE 1 is a fragmentary elevational view, partially cut away and partially in section to show details, of an electric motor utilizing the present invention;

FIGURE 2 is an exploded perspective view of the bearing assembly of one embodiment of the present invention; and FIGURE 3 is a perspective view of one element of another embodiment of the present invention.

Referring now to the drawing, and particularly to FIGURE 1 thereof, there is shown an electric motor 10 having an outer casing 11 which supports a stator 12 therein. Stator 12 has a central opening therethrough which receives an armature (not shown) carried by a rotatable shaft 13. Shaft 13 also carries a collet 14 which slips over shaft 13 to support a motor cooling fan 15. Fan 15 is secured to collet 14 by means of a sleeve 16 having an outwardly projecting flange 17 which engages fan 15 and clamps it into engagement with a shoulder 18 projecting outwardly from the outer surface of collet 14. None of the foregoing, with the exception of the rotatable shaft 13, forms an important part of the present invention and may vary considerably from that illustrated in FIGURE 1 without seriously affecting the present invention.

Bearing means are provided to support one end of shaft 13 and include a substantially spherical support 19 having a central opening therethrough which receives a cylindrical radial bearing 20 through which shaft 13 passes. It is to be understood, of course, that a second spherical support and cylindrical bearing similar to support 19 and bearing 20 may be provided at the other end of shaft 13; however, for the purposes of this description, it is necessary to describe only one of the support bearing arrangements. Support 20 is carried by a plurality of tabs 21 bent out from a portion of casing 11. Moreover, support 19 is maintained in supported relationship with tabs 21 by a plurality of tabs 22 bent out from a member 23 suitably secured to the inner surface of casing 11 by such means as welding or threaded screw fasteners or simply a press fit into casing 11.

A lubrication system for the above-described bearing is provided and includes a reservoir wick 24 of generally cylindrical configuration supported within a chamber 25 defined by a housing 26 and the outer surface of casing 11. A combined feeder and return wick 27 having feeder wick portions 28 and return wick portions 29 is also provided. Feeder wick portions 28 are in lubricant-receiving relationship with reservoir wick 24 and are adapted to convey lubricant, by capillary action, from reservoir wick 24 to shaft 13. Shaft 13 is provided with a spiral pumping groove 30 which, as shaft 13 rotates in a counterclockwise direction when viewed from the left in FIGURE 1, pumps lubricant received from feeder wick portions 28 through cylindrical bearing 20 thereby providing lubrication between rotating shaft 13 and the stationary bearing 20.

Openings 31 are provided in member 23 and casing 11 through which return wick portions 29 pass. An annular collecting means 32 is supported by casing 11 to catch and collect any excessive lubricant or oil pumped by groove 30. The purpose of return wick portions 29 is to pick up and return directly to shaft 13 lubricant collected by collecting means 32. In the event that feeder wick portions 28 provide excessive lubricant for pumping groove 30 and return wick portions 29 are unable to convey that quantity of lubricant out of collecting means 32, the lubricant will pass through openings 31 into chamber 25 and return to reservoir wick 24 thereby avoiding any loss of lubricant from collecting means 32 into the interior of casing 11.

The foregoing lubrication system is disclosed and claimed by Thomas E. Jenkins in application Ser. No. 523,341, filed Jan. 27, 1966, and assigned to the General Electric Company, assignee of the present invention. As will become evident as this description proceeds, the exact lubrication system, as thus far described, is not critical to the present invention and may depart considerably from that disclosed. The important aspect is that some means is provided to supply lubricant to the thrust bearing which is described below.

In accordance with the present invention, a thrust bearing assembly is provided and includes a stationary thrust plate 33 having a central opening therethrough adapted to partially slip over the end portion of radial bearing 20. Stationary thrust plate 33 has a pair of projections 34, best seen in FIGURE 2, which fit into openings provided in support 19 to prevent rotation of thrust plate 33. A rotatable thrust plate 35 is carried by shaft 13 to rotate therewith. Thrust plate 35 has a pair of projections 36 which are received by collet 14 so that thrust plate 35 rotates with collet 14 and shaft 13. Thrust plate 35 further abuts against the end of collet 14 so that axial thrust will be transmitted from shaft 13 through collet 14 to thrust plate 35. Rotatable thrust plate 35 has a bearing surface 37 facing a similar bearing surface on stationary thrust plate 33 and it is between these two surfaces that axial thrust is transmitted from the rotating elements to the stationary elements.

A stationary housing 38 encircles rotatable thrust plate 35 and has a radially inwardly projecting wall 39 which at least partially defines a receptacle for lubricant, as to be discussed in greater detail hereinafter. Housing 38 also has a cylindrical portion 40 extending axially of the shaft and cylindrical portion 40 is adapted to be secured to the periphery of stationary thrust plate 33 whereby thrust plate 33 supports housing 38. This is achieved, in the embodiment of FIGURES 1 and 2, by an annular tapered recess 41 which is adapted to snap over the outer periphery of thrust plate 33 to firmly engage thrust plate 33 and provide a substantially liquid-tight seal therebetween. This relationship is illustrated in FIGURE 1. Wall 39 defines a central opening through which shaft 13 and projections 36 pass. Thrust plate 33 is provided with a plurality of passageways 42 extending from the periphery of thrust plate 33 to the annular space defined by the large central opening in plate 33 which is adjacent to the inner portion of bearing surface 37.

As discussed above, lubrication of a thrust plate for a horizontal shaft is especially important so that an oil film may be maintained on the plate to minimize the possibility of direct contact between the rotating and stationary thrust plates. With the present invention, pumping groove 30 supplies lubricant to the inner portion of bearing surface 37. Centrifugal force, created by the rotation of thrust plate 35, moves this lubricant radially outwardly over bearing surface 37. As the lubricant moves outwardly, and reaches the outer periphery of thrust plate 35, it is slung into the receptacle defined by housing 38. Centrifugal force, again created by the rotation of thrust plate 35, prevents the lubricant from moving radially inwardly between thrust plate 35 and wall 39. However, as the lubricant builds up within housing 38, it is forced axially through the space between the outer periphery of stationary thrust plate 33 and cylindrical portion 40 of housing 38. From there, it is forced through passageways 42 into the central opening in stationary thrust plate 33. Any buildup of lubricant within the central opening of thrust plate 33, is again picked up by the centrifugal force created by the rotation of thrust plate 35 and follows the path just described. Thus, the present arrangement provides an improved thrust bearing and lubricating system therefor which maintains an oil film between mating bearing surfaces on a horizontal shaft.

To improve the pumping action created by the centrifugal force, a plurality of radially extending grooves 43 are provided on bearing surface 37 to create an additional pumping action on the lubricant supplied to the inner portion of bearing surface 37. Additionally, grooves 43 serve as a reservoir to contain lubricant which is immediately applied to bearing surface 37 upon initial rotation of shaft 13 so that bearing surface 37 is not required to wait until pumping groove 30 provides an initial supply of lubricant. It is to be understood that grooves 43 may vary considerably from the configuration illustrated in FIGURE 2 and that, although they must extend radially in some fashion, they could be of spiral configuration rather than extending directly radially outwardly. It should be noted that each of grooves 43 terminates short of the periphery of bearing surface 37 which provides a build up of oil within the grooves to be spread out between the grooves on surface 37 rather than pumped directly out beyond the periphery of plate 35. It should be further noted that the effective total cross sectional area of grooves 43 is less than the total cross sectional area of passageways 42 so that the limiting factor of the flow of lubricant through the system is grooves 43 rather than passageways 42. In the event that pumping groove 30 provides an excessive amount of lubricant to the thrust bearing system, lubricant can escape through the large central opening defined by wall 39 and will be collected by collecting means 32 as described above.

Turning next to FIGURE 3, there is shown a modified form of a stationary thrust plate. Stationary thrust plate 44, of FIGURE 3, has a flange 45 coplanar with its bearing surface thus providing an annular recess 46 about its outer periphery. With the recess 46, housing 38 can be formed without recess 41 and can be made of a suitably malleable material so that a portion of cylindrical portion 40 can be rolled into recess 46 thus providing a permanent and rigid engagement between housing 38 and thrust plate 44. With this arrangement, it is necessary to provide means for lubricant to pass from the outer periphery of thrust plate 35 to passageways 47, it being understood that passageways 47 are identical in all respects to passageways 42 of thrust plate 33. This means includes a plurality of openings 48 formed in flange 45. Projection 49, similar to projection 34 of FIGURE 2, may be provided to keep thrust plate 44 and housing 38 stationary.

The present invention has performed suitably with rotating thrust plate 35 formed from hardened tool steel, stationary thrust plate 33 formed from nylon and housing 38 formed from an acetal copolymer presently commercially available under the trademark Celcon from Celanese Plastics Company. Of course, other materials may be employed as evidenced by the modification discussed in connection with FIGURE 3 wherein housing 38 may be made from malleable metal, and stationary thrust plate 44 of suitable bearing alloy, such as brass.

As will be evident from the foregoing description, certain aspects of the invention are not limited to the particular details of construction of the example illustrated, and it is contemplated that various other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. A thrust bearing assembly comprising:
   (a) a stationary thrust plate having a first bearing surface,
   (b) a rotatable thrust plate carried by a shaft and having a second bearing surface facing said first bearing surface,
   (c) a stationary housing encircling said rotatable thrust plate and having a radially inwardly projecting wall at least partially defining a receptacle for lubricant, (d) at least a major portion of each of said first and second bearing surfaces extending into said receptacle, and (e) means to supply lubricant to the inner portion of said second bearing surface, (f) said second bearing surface having at least one radially extending groove therein terminating short of the periphery of said second bearing surface to create a pumping action on the lubricant supplied to the inner portion of said second bearing surface and to serve as a reservoir to supply lubricant between said bearing surfaces upon initial rotation of said rotatable thrust plate.

2. The invention of claim 1 wherein said means to supply lubricant to the inner portion of said second bearing surface comprises a spiral groove on the shaft.

3. The invention of claim 1 further comprising at least one passageway in said stationary thrust plate to return lubricant from said receptacle to said inner portion of said second bearing surface.

4. A thrust bearing assembly comprising:
(a) a stationary thrust plate having a first bearing surface,
(b) a rotatable thrust plate carried by a shaft and having a second bearing surface facing said first bearing surface,
(c) a stationary housing disposed about said rotatable thrust plate,
(d) at least one radially extending groove in said second bearing surface terminating short of the periphery of said second bearing surface,
(e) means to supply lubricant to the inner portion of said second bearing surface, and
(f) a plurality of passageways in said stationary thrust plate extending from the periphery of said stationary thrust plate to the inner portion of said second bearing surface.

5. The invention of claim 4 wherein the total cross sectional area of said passageways is greater than the greatest total cross sectional area of at least one radial extending groove.

6. The invention of claim 4 wherein said housing has a cylindrical portion extending axially of the shaft and said cylindrical portion is adapted to be secured to the periphery of said stationary thrust plate whereby said stationary thrust plate supports said housing.

7. The invention of claim 6 wherein said housing further comprises a radially inwardly projecting wall at one end of said cylindrical portion to at least partially define a receptacle for lubricant with said plurality of passageways serving to return lubricant from said receptacle to the inner portion of said second bearing surface.

8. The invention of claim 6 wherein said stationary thrust plate is generally cylindrical and has an annular flange at each end thereof defining an annular recess, said cylindrical portion of said housing being adapted to fit over said flanges and be secured thereto by rolling a portion of said cylindrical portion radially into said recess, one of said flanges having at least one opening therein for flow of lubricant therethrough from said rotatable thrust plate to said plurality of passageways.

References Cited

UNITED STATES PATENTS

| | | | |
|---|---|---|---|
| 1,476,345 | 12/1923 | McGee | 308—161 |
| 2,752,208 | 6/1956 | Wightman | 308—132 |
| 2,953,416 | 9/1960 | Collins et al. | 308—161 |

FOREIGN PATENTS

| | | |
|---|---|---|
| 583,299 | 2/1957 | Italy. |
| 629,626 | 5/1936 | Germany. |

MARTIN P. SCHWADRON, *Primary Examiner.*

FRANK SUSKO, *Assistant Examiner.*

U.S. Cl. X.R.

308—168